United States Patent
Doddavula et al.

(10) Patent No.: US 9,535,749 B2
(45) Date of Patent: Jan. 3, 2017

(54) METHODS FOR MANAGING WORK LOAD BURSTS AND DEVICES THEREOF

(71) Applicant: Infosys Limited, Bangalore (IN)

(72) Inventors: Shyam Kumar Doddavula, Bangalore (IN); Mudit Kaushik, Subhash Bazaar Mawana (IN); Joel Mathew, Tiruvalla (IN)

(73) Assignee: Infosys Limited, Bangalore (IN)

( * ) Notice: Subject to any disclaimer, the term of this patent is extended or adjusted under 35 U.S.C. 154(b) by 310 days.

(21) Appl. No.: 13/891,955

(22) Filed: May 10, 2013

(65) Prior Publication Data

US 2013/0305245 A1  Nov. 14, 2013

(30) Foreign Application Priority Data

May 11, 2012 (IN) ............................ 1882/CHE/2012

(51) Int. Cl.
  *G06F 9/46* (2006.01)
  *G06F 9/50* (2006.01)
  *G06F 9/455* (2006.01)

(52) U.S. Cl.
  CPC .................. *G06F 9/50* (2013.01); *G06F 9/455* (2013.01); *G06F 9/5083* (2013.01)

(58) Field of Classification Search
  None
  See application file for complete search history.

(56) References Cited

U.S. PATENT DOCUMENTS

| | | | |
|---|---|---|---|
| 8,429,276 B1 * | 4/2013 | Kumar | G06F 9/5077 709/226 |
| 8,874,457 B2 * | 10/2014 | Biran et al. | 705/7.12 |
| 9,021,499 B2 * | 4/2015 | Mopur et al. | 718/105 |
| 2007/0180447 A1 * | 8/2007 | Mazzaferri et al. | 718/1 |
| 2008/0134316 A1 | 6/2008 | Devonshire et al. | |
| 2009/0027677 A1 | 1/2009 | Willing et al. | |
| 2009/0300210 A1 | 12/2009 | Ferris | |
| 2010/0088150 A1 | 4/2010 | Mazhar et al. | |
| 2010/0131948 A1 | 5/2010 | Ferris | |
| 2010/0169477 A1 | 7/2010 | Stienhans et al. | |

(Continued)

OTHER PUBLICATIONS

IBM Fact Sheet: IBM CloudBurst, 2 pages, http://www-03.ibm.com/press/us/en/attachment/27700.wss?filed=ATTACH_FILE1 &fileName=Fact%20Sheet%20IBM%20CloudBurst_FINAL.doc (Feb. 8, 2012).

(Continued)

*Primary Examiner* — Kenneth Tang
(74) *Attorney, Agent, or Firm* — LeClairRyan, a Professional Corporation

(57) ABSTRACT

A method, non-transitory computer readable medium, and resource management computing device comprises identifying one or more workload bursts in a production environment. One or more additional resources in a non-production environment required to manage the one or more workload burst in a production environment is determined by comparing an environment resource consumption value against a permissible maximum value, wherein the environment resource consumption value is a value indicating usage of each of the one or more resources. One or more additional resources are identified in the non-production environment. The identified one or more additional resources are provided to handle the one or more workload bursts.

18 Claims, 5 Drawing Sheets

| | Percentage | Number of VMs | CPU (MHz) | Memory (MB) |
|---|---|---|---|---|
| Total Resource | 100 | 20 | 9723.0 | 5235.0 |
| Other | 86 | 17 | 5906.0 | 4513.89453125 |
| Free Resources | 1 | 0 | 97.23 | 52.35 |
| *1 VM = 20Mhz (CPU) & 256 MB (Memory) | | | | |

| Organization Name | Optimum (%) | Max (%) | Min (%) | Share |
|---|---|---|---|---|
| A | 12 | 100 | 4 | 90 |
| B | 1 | 100 | 0 | 100 |

| | Percentage | Number of VMs | CPU (MHz) | Memory (MB) |
|---|---|---|---|---|
| Total Resources | 100 | 2 | 1166.0 | 628.0 |
| Free Resources | 24 | 0 | 279.84 | 150.72 |
| *1 VM = 20Mhz (CPU) & 256 MB (Memory) | | | | |

| Environment Name | Optimum (%) | Max (%) | Min (%) | Share |
|---|---|---|---|---|
| A | 8 | 0 | 100 | 10 |
| B | 40 | 40 | 100 | 20 |
| C | 20 | 0 | 100 | 30 |
| D | 8 | 0 | 100 | 40 |

(56) References Cited

U.S. PATENT DOCUMENTS

| | | | |
|---|---|---|---|
| 2011/0010721 A1* | 1/2011 | Gupta et al. | ............... 718/103 |
| 2011/0016214 A1 | 1/2011 | Jackson | |
| 2011/0016473 A1 | 1/2011 | Srinivasan | |
| 2011/0058202 A1 | 3/2011 | St. Jacques, Jr. et al. | |
| 2011/0072427 A1 | 3/2011 | Garmark | |
| 2011/0099095 A1 | 4/2011 | Moore et al. | |
| 2011/0099267 A1 | 4/2011 | Suri et al. | |
| 2011/0107398 A1 | 5/2011 | Earl et al. | |
| 2011/0137805 A1 | 6/2011 | Brookbanks et al. | |
| 2011/0145094 A1 | 6/2011 | Dawson et al. | |
| 2011/0145153 A1 | 6/2011 | Dawson et al. | |
| 2011/0173038 A1 | 7/2011 | Moon et al. | |
| 2011/0185064 A1 | 7/2011 | Head et al. | |
| 2011/0191477 A1 | 8/2011 | Zhang et al. | |
| 2011/0258621 A1* | 10/2011 | Kern | ............... G06F 9/5072 718/1 |
| 2011/0289204 A1* | 11/2011 | Hansson | ............... G06F 9/5077 709/224 |
| 2012/0173709 A1* | 7/2012 | Li | ............... G06F 9/5061 709/224 |
| 2012/0180041 A1* | 7/2012 | Fletcher | ............... 718/1 |
| 2012/0185848 A1* | 7/2012 | Devarakonda et al. | ............... 718/1 |
| 2012/0284712 A1* | 11/2012 | Nimmagadda et al. | ............... 718/1 |
| 2013/0212578 A1* | 8/2013 | Garg | ............... H04L 43/0882 718/1 |

OTHER PUBLICATIONS

Gopalan, Prabhakar, "Workload automation for the cloud," White Paper, Aug. 2010, 15 pages, ca® technologies.

Zhang et al., "Intelligent Workload Factoring for a Hybrid Cloud Computing Model," IEEE Computer Society, pp. 701-708 (2009).

Mi et al., "NSF PI Meeting: The Science of Cloud Computing," retrieved from http://nsfcloud2011.cs.ucsb.edu/papers/Mi_Paper on May 10, 2013 (2011).

PBS Works, "PBS Professional Commercial-Grade HPC Workload And Resource Management", website, Retrieved From: http://pbsworks.com/images/solutions-en-US/PBS-Pro_Database_web.pdf, Aug. 1, 2016, Altair Engineering Inc.

* cited by examiner

|  | Percentage | Number of VMs | CPU (MHz) | Memory (MB) |
|---|---|---|---|---|
| Total Resource | 100 | 20 | 9723.0 | 5235.0 |
| Other | 86 | 17 | 5906.0 | 4513.89453125 |
| Free Resources | 1 | 0 | 97.23 | 52.35 |
| *1 VM = 20Mhz (CPU) & 256 MB (Memory) | | | | |
| Organization Name | Optimum (%) | Max (%) | Min (%) | Share |
| A | 12 | 100 | 4 | 90 |
| B | 1 | 100 | 0 | 100 |

|  | Percentage | Number of VMs | CPU (MHz) | Memory (MB) |
|---|---|---|---|---|
| Total Resources | 100 | 2 | 1166.0 | 628.0 |
| Free Resources | 24 | 0 | 279.84 | 150.72 |
| *1 VM = 20Mhz (CPU) & 256 MB (Memory) | | | | |
|  |  |  |  |  |
| Environment Name | Optimum (%) | Max (%) | Min (%) | Share |
| A | 8 | 0 | 100 | 10 |
| B | 40 | 40 | 100 | 20 |
| C | 20 | 0 | 100 | 30 |
| D | 8 | 0 | 100 | 40 |

METHODS FOR MANAGING WORK LOAD BURSTS AND DEVICES THEREOF

This application claims the benefit of Indian Patent Application Filing No. 1882/CHE/2012, filed May 11, 2012, which is hereby incorporated by reference in its entirety.

FIELD

This technology generally relates to managing resources, more particularly, to methods for managing workload bursts within a computing environment and devices thereof.

BACKGROUND

Cloud computing generally relates to the delivery of computing as a service rather than a product, whereby resources, software and information are provided to computers and other devices as utility over a network. Additionally, cloud computing provides computation, software applications, data access and data management and storage resources without requiring cloud users to know the location and other details of the computing infrastructure.

End users access cloud based applications through a web browser while the business software and data are stored on servers at a remoter location.

Private cloud is infrastructure operated for an organization and can be managed internally or externally. Further, there are numerous applications running on each of the servers which require several processors and memory for executing instructions. However, due to the non-uniform use of these applications, handling sudden demand of resources (workload bursts) by the applications and managing resources within the cloud computing environment becomes critical.

In the existing technologies, resources are managed by creating resources pools and specifying percentage of resources that need to be reserved for different virtual machines that belong to a resource pool. The reservation can be at individual level or can be at the level of group of virtual machines. However, the existing technologies have limitations that resources may not get utilized all the time. Additionally, there are methods in the existing technologies which enable allocation of resources to virtual machines based on priorities set for different workload.

SUMMARY

A method for managing workload bursts within a computing environment including a resource management computing device identifying one or more workload bursts in a production environment. The resource management computing device determines one or more additional resources in a non-production environment to manage the one or more workload burst in a production environment by comparing an environment resource consumption value against a permissible maximum value, wherein the environment resource consumption value is a value indicating usage of each of the one or more resources. One or more additional resources are identified in the non-production environment by the resource management computing device. The identified one or more additional resources are provided to handle the one or more workload bursts by the resource management computing device.

A non-transitory computer readable medium having stored thereon instructions for managing workload bursts comprising machine executable code which when executed by at least one processor, causes the processor to perform steps including identifying one or more workload bursts in a production environment. One or more additional resources in a non-production environment required to manage the one or more workload burst in a production environment is determined by comparing an environment resource consumption value against a permissible maximum value, wherein the environment resource consumption value is a value indicating usage of each of the one or more resources. One or more additional resources are identified in the non-production environment. The identified one or more additional resources are provided to handle the one or more workload bursts.

A resource management computing device comprising one or more processors, a memory, comprising an updated knowledge base, wherein the memory coupled to the one or more processors which are configured to execute programmed instructions stored in the memory including identifying one or more workload bursts in a production environment. One or more additional resources in a non-production environment required to manage the one or more workload burst in a production environment is determined by comparing an environment resource consumption value against a permissible maximum value, wherein the environment resource consumption value is a value indicating usage of each of the one or more resources. One or more additional resources are identified in the non-production environment. The identified one or more additional resources are provided to handle the one or more workload bursts.

This exemplary technology provides a number of advantages including providing more effective methods, non-transitory computer readable medium and devices for managing workload bursts by terminating resources from a non-production environment and providing the resources to the production environment where the workload bursts is identified. Additionally, this technology provides handling workload bursts through allocating of spare resources which are made available through release of resources from a lower priority environment. Further, this technology provides effective utilization of resources present in the infrastructure and timely execution on applications which require these resources.

BRIEF DESCRIPTION OF THE DRAWINGS

FIG. 4 is an exemplary table.

DETAILED DESCRIPTION

Figure 1:
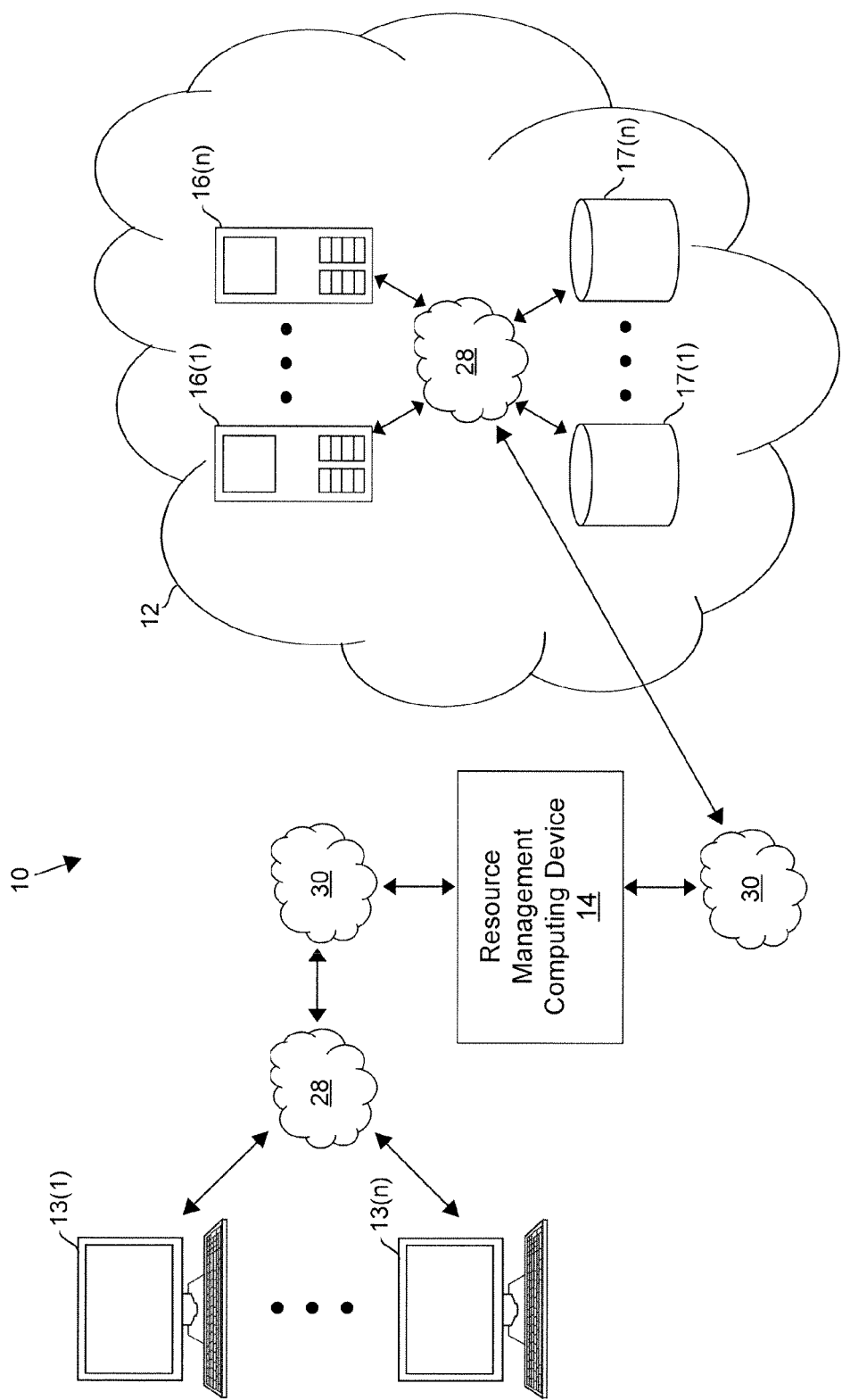
FIG. 1 is a block diagram of an exemplary cloud computing environment which includes an exemplary resource management computing device that manages workload bursts.
Figure 2:
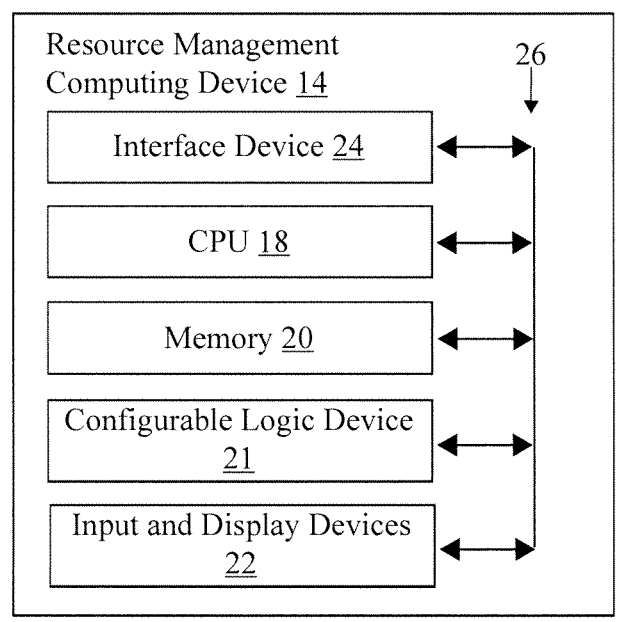
FIG. 2 is an exemplary resource management computing device.

An exemplary cloud computing environment 10 with an exemplary resource management computing device 14 is illustrated in FIGS. 1-2. The environment 10 includes one or more client computing devices 13(1)-13(n), the resource management computing device 14, a plurality of server computing devices 16(1)-16(n) and a plurality of memory storage devices 17(1)-17(n) clustered within a cloud 12, although the environment 10 could comprise other types and numbers of systems, devices, components and elements in other configurations and other types of network environments. This exemplary technology provides a number of advantages including providing more effective methods, non-transitory computer readable medium and devices for managing workload bursts by terminating resources from a non-production environment and providing the resources to the production environment where the workload bursts is identified.

Referring more specifically to FIG. 1, in this example the cloud computing environment 10 offers services to client computing devices 13(1)-13(n) outside of the cloud 12, such as web services or the provision of software, platforms, infrastructure and/or storage as services, although other types of services could be offered. Additionally, in this example, the resource management computing device 14 is configured to receive inbound service requests from a web browser or other application running on client computing devices 13(1)-13(n), although the resource management computing device 14 could receive other types of requests from other sources. The resource management computing device 14 also sends corresponding outbound service requests to corresponding applications run on one or more of the plurality of server computing devices 16(1)-16(n) and/or on the plurality of memory storage devices 17(1)-17(n) within the cloud 12, although the requests could be sent to other types of systems and devices to be serviced. The resource management computing device 14 can dynamically provision the transmission of these service requests based on the load on each of the plurality of server computing devices 16(1)-16(n) and/or on the plurality of memory storage devices 17(1)-17(n) within the cloud 12, although other manners for provisioning could be used. Further, the resource management computing device 14 receives the responses to these service requests from one or more of the plurality of server computing devices 16(1)-16(n) and/or on the plurality of memory storage devices 17(1)-17(n) within the cloud 12 which are then sent the resource management computing device 14 back to the corresponding requesting client computing devices 13(1)-13(n).

The resource management computing device 14 interacts with the client computing devices 13(1)-13(n), the plurality of server computing devices 16(1)-16(n) and the plurality of memory storage devices 17(1)-17(n) through a communication network comprising LANs 28 and WAN 30, although the resource management computing device 14 may interact with other types and numbers of systems and devices through other types of communication networks with other network topologies.

Each of the client computing devices 13(1)-13(n) include a central processing unit (CPU) or processor, a memory, an interface device, and an I/O system, which are coupled together by a bus or other link, although other numbers and types of network devices could be used. In this example, each of the client computing devices 13(1)-13(n) includes one or more applications which provide an interface required to access the various applications on or more of the plurality of server computing devices 16(1)-16(n) and/or plurality of memory storage devices 17(1)-17(n) hosted within the cloud 12, although other manners for accessing can be used. By way of example only, the application on each of the client computing devices 13(1)-13(n) could be a web browser, although other types of applications and/or data may be present in each of the client computing devices 13(1)-13(n). In this example the client computing devices 13(1)-13(n) are personal computing devices, although other types and numbers of client computing devices, such as computing tablets and mobile devices by way of example only could be used.

Each of the plurality of server computing devices 16(1)-16(n) includes a central processing unit (CPU) or processor, a memory, an interface device, and an I/O system, which are coupled together by a bus or other link, although other numbers and types of network devices could be used. In this example, each of the plurality of server computing devices 16(1)-16(n) include applications and/or data required to process the request, although other types of programs and information may be present in each of the plurality of server computing devices 16(1)-16(n). The plurality of server computing devices 16(1)-16(n) are present in one geographical location, although one or more of the plurality of server computing devices 16(1)-16(n) could be in other geographical locations.

Each of the plurality of memory storage devices 17(1)-17(n) includes a central processing unit (CPU) or processor, a memory, an interface device, and an I/O system, which are coupled together by a bus or other link, although other numbers and types of network devices with other types and numbers of components could be used. Each of the plurality memory storage devices 17(1)-17(n) includes applications and/or data required to process the request, although other types of programs and information may be present in each of the plurality of memory storage devices 17(1)-17(n). The plurality memory storage devices 17(1)-17(n) also are present in one geographical location, although one or more of the plurality memory storage devices 17(1)-17(n) could be in other geographical locations.

The resource management computing device 14 manages production workload bursts as illustrated and described by way of way of the examples herein, although resource management computing device 14 may perform other types and numbers of functions and interact with other systems and devices. With reference to FIG. 2, the resource management computing device 14 includes at least one processor 18, memory 20, stored database 21 within the memory 20, input and display devices 22, and interface device 24 which are coupled together by bus 26, although resource management computing device 14 may comprise other types and numbers of elements in other configurations.

The processor 18 in the resource management computing device 14 executes a program of stored instructions for one or more aspects of the present technology as described and illustrated by way of the examples herein, although other types and numbers of processing devices and logic could be used and the processor could execute other numbers and types of programmed instructions. The processor 18 may comprise one or more central processing units ("CPUs") or general purpose processors with one or more processing cores, such as AMD®, processor(s), although other types of processor(s) could be used (e.g., Intel®).

Figure 3A:
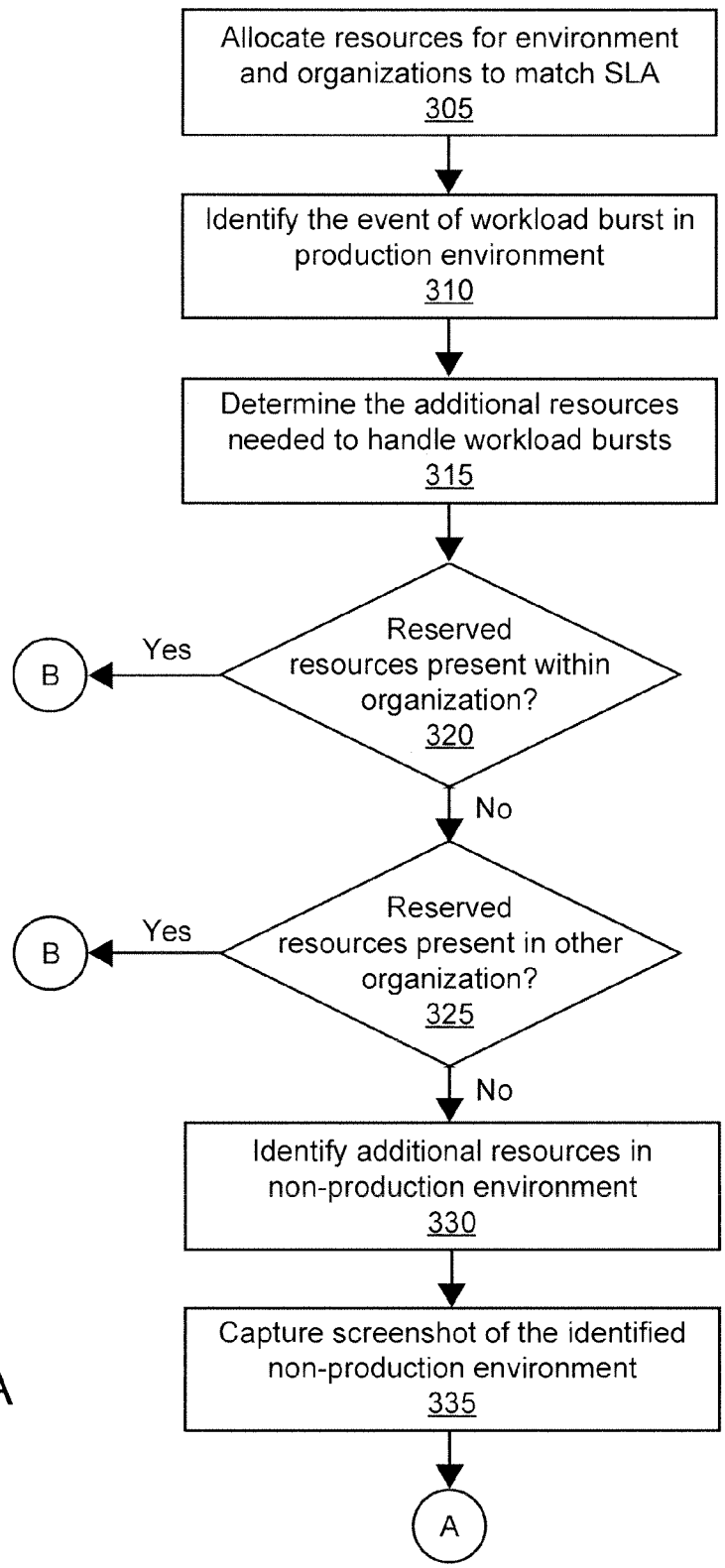
FIGS. 3A-3B are flow charts of an exemplary method for managing workload bursts.
Figure 3B:
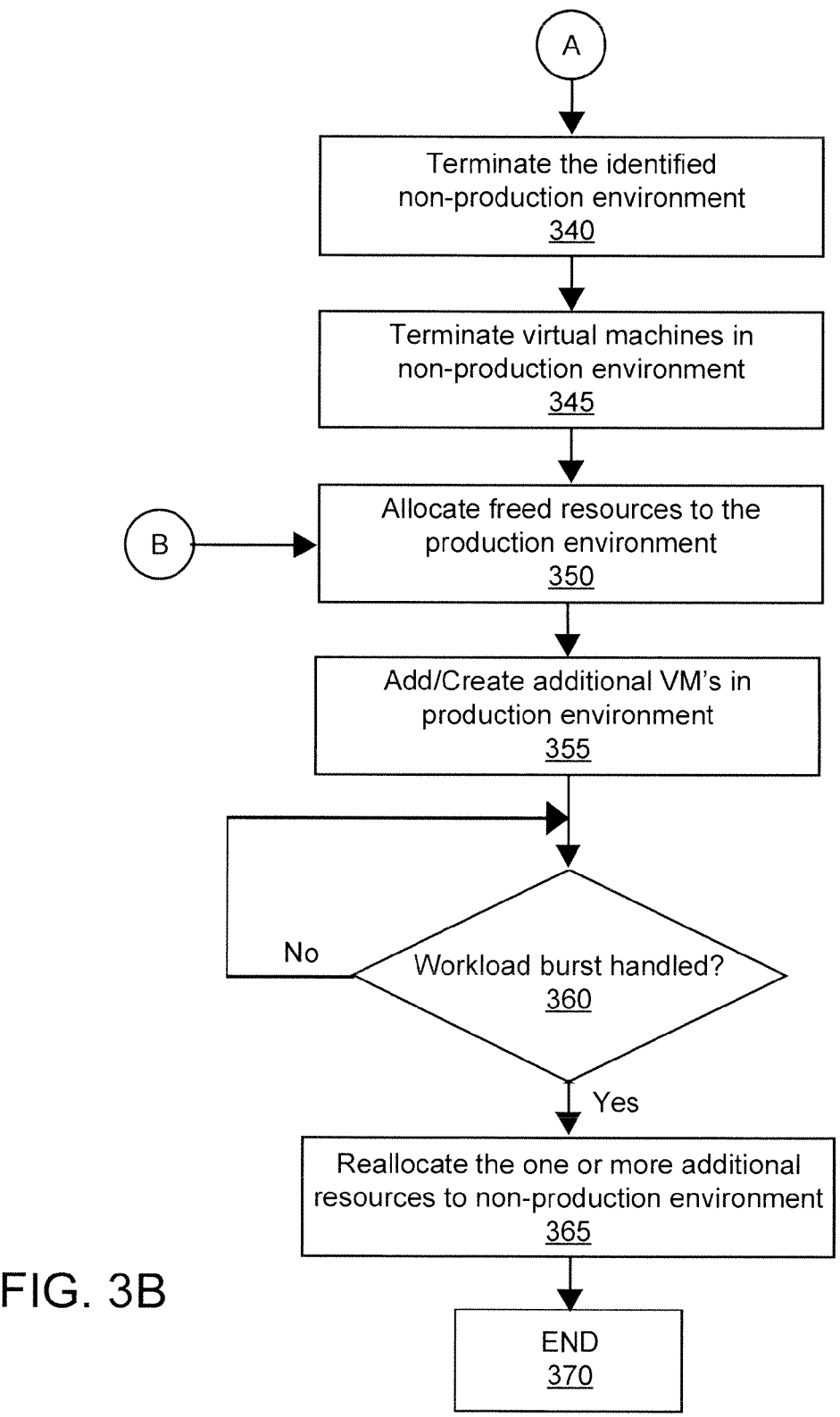

The memory 20 in the resource management computing device 14 stores these programmed instructions for one or more aspects of the present technology as described and illustrated herein, such as the steps illustrated and described with reference to FIGS. 3A-3B, although some or all of the programmed instructions could be stored and executed elsewhere. A variety of different types of memory storage devices, such as a random access memory (RAM) or a read only memory (ROM), flash memory, a floppy disk, hard disk, CD ROM, DVD ROM, solid state memory, or other non-transitory computer readable medium which is read from and written to by a magnetic, optical, or other reading and writing system that is coupled to the processor 18 in the resource management computing device 14, can be used for the memory 20.

Input and display devices 22 enables a user, such as an administrator, to interact with the resource management computing device 14, such as to input and/or view data and/or to configure, program and/or operate it by way of example only. Input devices may include a keyboard and/or a computer mouse and display devices may include a computer monitor, although other types and numbers of input devices and display devices could be used.

The interface device 24 in the resource management computing device 14 is used to operatively couple and communicate between the resource management computing device 14 and client computing devices 13(1)-13(n), the plurality of server computing devices 16(1)-16(n), and/or the plurality of memory storage devices 17(1)-17(n) which are all coupled together through one or more LAN 28 or WAN 30, although the interface device can be used to communicate with other types and numbers of systems, devices, components and elements. By way of example only, the interface device 24 can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other bus types and links may be used, such as PCI.

Although an exemplary cloud computing environment 10 with the resource management computing device 14, the plurality of server computing devices 16(1)-16(n), plurality of memory storage devices 17(1)-17(n) and communication network comprising LANs 28 and WAN 30 are described and illustrated herein, other types and numbers of systems, devices in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for managing work load bursts will now be described with reference to FIGS. 1-4. Referring more specifically to FIGS. 3A-3B, in step 305 the resource management computing device 14 allocates one or more resources to an organization and their respective production environment and/or a non-production environment. In this example, resources refer to one or more server computing devices 16(1)-16(n) and/or one or more memory storage devices 17(1)-17(n), although the resources may include other types and numbers of systems, devices, components, or elements, such as switches or blades, in other configurations. Further, the resource management computing device 14 captures all the information regarding the allocation of one or more resources in a table and stores it in the memory 20, although other manners for recording the allocation can be used.

In this example, a production environment relates to a development environment wherein certain resources are designated to specific stages in a process or an application and a non-production environment in this example relates to a testing environment where the application/software is tested before developing it in the production environment. Additionally, in this example an organization relates to a company/corporation and its respective areas of work, such as healthcare or banking by way of example, and production environment in this example relates to the ongoing developments/projects within the organization which uses one or more resources, such as to one or more of the server computing devices 16(1)-16(n) and/or one or more of the memory storage devices 17(1)-17(n). In this example, the resource management computing device 14 allocates one or more resources to the production or non-production environment using a quota system, although other manners for allocation could be used. In this example, quota system means allocating a percentage or value to the resources which are allocated and the quota system can be implemented using an optimum value, minimum value, maximum value and a share value as illustrated in the exemplary table shown in FIG. 4.

In step 310, the resource management computing device 14 identifies an event of workload burst in a production environment by periodically monitoring the resource consumption in a production environment, although other manners for identifying bursts could be used. The resource management computing device 14 monitors the resource consumption through a sub-level aggregation approach wherein an environment resource consumption value is calculated based on one or more parameters, although other manners for monitoring consumption could be used. The resource management computing device 14 calculates the environment resource consumption value by adding all the resource consumption in a service and an instance, although other manners for calculating environmental resource consumption could be used. Further, the resource management computing device 14 calculates the service or instance resource consumption by adding all the resources used by the virtual machines which are associated to the service or the instance, although other manners for calculating the service or instance consumption could be used. The resource management computing device 14 identifies the workload burst when the environment resource consumption value in the production environment exceeds the permissible maximum value, although again other manners for identifying the workload burst could be used. In this example, the permissible maximum value is stored in memory 20 in the resource management computing device 14, although other manners for obtaining this value could be used. In this example, the permissible maximum value relates to a maximum value at which all of the allocated one or more resources are being utilized.

In step 315, the resource management computing device 14 determines the capacity needed to handle the workload burst and meet the application's service level agreement (SLA). The resource management computing device 14 determines the capacity required to handle the workload burst by calculating the difference between the environment resource consumption value and the permissible maximum value, although other manners for determining capacity can be used.

In step 320, the resource management computing device 14 determines if one or more reserve resources allocated to the non-production environment within an organization are available for allocation. If the resource management computing device 14 determines one or more reserved resources allocated to the non-production environment within the organization are available, then the Yes branch is taken to step 350. If the resource management computing device 14 determines one or more reserved resources allocated to the non-production environment within the organization are not available, then the No branch is taken to step 325.

In step 325, the resource management computing device 14 determines if one or more reserve resources allocated to the non-production environment in another organization are available for allocation. If the resource management computing device 14 determines one or more reserve resources allocated to the non-production environment in another organization are available for allocation, then the Yes branch is taken to step 350. If the resource management computing device 14 determines one or more reserve resources allocated to the non-production environment in another organization are not available for allocation, then the No branch is taken to step 330.

In step 330, the resource management computing device 14 identifies one or more additional resources within non-production environment of the same organization or a different organization by selecting the one or more additional resources with the least critical share value, although other manners for making the selection can be used. The share value is the value assigned back in step 305. The share value is a numerical value to settle any contention related to priority in terms of resource holding among the organizations. In this example, the resource management computing device 14 identifies the one or more additional resources within the same organization by selecting the one or more additional resources with the least share value. FIG. 4 illustrates the share value assigned to each of the one or more additional resources.

In step 335, the resource management computing device 14 captures one or more snapshots of the non-production environment which includes the identified one or more additional resources to be allocated to assist with the workload burst, although other manners for obtaining a snapshot or captured status of the one or more additional resources in the nonproduction environment prior to the allocation could be used. The one or more snapshots are captured by the resource management computing device 14 to re-create the same state and configuration once the workload burst is handled. Once the resource management computing device 14 has captured the one or more snapshots, the resource management computing device 14 sends a notification to the non-production environment to indicate the termination of the one or more additional resources in the nonproduction environment which have been allocated to assist with the burst. Additionally, the resource management computing device 14 sends an additional task of de-provisioning workflow with the notification.

In step 340, the resource management computing device 14 terminates the identified one or more additional resources in the non-production environment after sending the notification. The one or more additional resources are free to be allocated to the identified one or more workload bursts in the production environment after the resource management computing device 14 terminates the identified one or more additional resources in the non-production environment. The resource management computing device 14 terminates the identified one or more additional resources within the same organization or across a different organization. In this particular example, the resource management computing device 14 terminates the identified one or more additional resources within the same organization.

In step 345, the resource management computing device 14 identifies and terminates all the virtual machines associated with the identified non-production environment. In this example, each of the identified one or more additional resources in the non-production environment comprises a virtual machine associated with it. The virtual machines provide an interface to use the identified one or more additional resources within an organization or across different organizations. The resource management computing device 14 terminates the virtual machines associated with the identified non-production environment to release the allocated resources after sending them a notification as described in step 340.

In step 350, the resource management computing device 14 allocates the identified one or more additional resources from the non-production environment identified in step 330 and/or one or more reserved resources from the production environment which was determined in step 325 to the production environment in which the workload burst was identified in step 310. In this particular example, the resource management computing device 14 allocates the identified one or more additional resources from the non-production environment identified in step 330 within the same organization.

In step 355, the resource management computing device 14 add/creates additional virtual machines in the production environment in which the workload burst was identified. The resource management computing device 14 creates additional virtual machines in the production environment to facilitate the use of one or more additional resources allocated in step 350 by providing the interface to use the identified one or more additional resources. Further, the resource management computing device 14 performs dynamic clustering and/or load balancing on the one or more additional resources allocated in step 350 to cater the need of handling workload burst and the process ends in step 370.

In step 360, the resource management computing device 14 determines if the identified one or more workload burst has been handled by calculating the difference between the environment resource consumption value and the permissible maximum value as set forth in step 315. If the resource management computing device 14 determines the environment resource consumption value is less than the permissible maximum value, then the Yes branch is taken to step 365. If the resource management computing device 14 determines the environment resource consumption value is not less than the permissible maximum value, then the No branch is taken to step 360, to wait until the resource management computing device determines handling of the identified one or more workload burst within the production environment.

In step 365, the resource management computing device 14 terminates the one or more additional resources allocated to the identified one or more workload burst within the production environment and re-allocates the one or more additional resources back to the identified non-production environment in step 330. Additionally, the resource management computing device 14 refers to the captured one or more snapshots in step 33 to recreate the same state and configuration of the non-production environment before the workload burst and ends the process in step 370.

Accordingly, as illustrated and described with the examples herein, this technology provides more effective methods, non-transitory computer readable medium and devices for managing workload bursts by terminating resources from a non-production environment and providing the resources to the production environment where the workload bursts is identified. Additionally, this technology provides handling workload bursts through allocating of spare resources which are made available through release of resources from a lower priority environment. Further, this technology provides effective utilization of resources present in the infrastructure and timely execution on applications which require these resources.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for managing workload bursts within a computing environment, the method comprising:
   identifying, by a resource management computing device, one or more reserved resources and one or more workload bursts in a production environment based on a resource consumption level exceeding a maximum permissible value, wherein the resource consumption level indicates usage of the one or more reserved resources in the production environment;
   determining, by the resource management computing device, an allocation of one or more additional resources required to manage the one or more workload bursts in the production environment based on the indicated difference in usage of the one or more reserved resources, in the production environment, between the resource consumption value and the permissible maximum value;
   identifying, by the resource management computing device, the determined allocation of the one or more additional resources in a non-production environment based on one or more share values which prioritize the determined allocation of the one or more additional resources; and
   providing, by the resource management computing device, the one or more reserved resources and the identified one or more additional resources from the non-production environment to the production environment based at least in part on the identified one or more share values.

2. The method as set forth in claim 1, further comprising:
   capturing, by the resource management computing device, one or more snapshots of the non-production environment after the identifying the one or more additional resources, wherein the one or more snapshots are used to re-create the non-production environment; and
   providing, by the resource management computing device, a notification to the non-production environment to indicate termination of the identified one or more additional resources.

3. The method as set forth in claim 1, wherein the identifying the one or more additional resources further comprises:
   identifying, by the resource management computing device, one or more virtual machines associated with the non-production environment as one of the identified one or more additional resources.

4. The method as set forth in claim 3, further comprising:
   providing by the resource management computing device the notification to the non-production environment, wherein the notification indicates the termination of the one or more virtual machines.

5. The method as set forth in claim 1, wherein the identifying the one or more workload further comprising:
   identifying by the resource management computing device, the one or more workload bursts by monitoring usage of the one or more resources in the production environment, wherein the monitoring further comprises comparing usage of the one or more resources against a maximum threshold value.

6. The method as set forth in claim 1, wherein the providing further comprises:
   creating, by the resource management computing device, one or more virtual machines in the production environment; and
   providing, by the resource management computing device, the created one or more virtual machines to the production environment.

7. A non-transitory computer readable medium having stored thereon instructions for managing workload bursts within a computing environment comprising machine executable code which when executed by at least one processor, causes the processor to perform steps comprising:
   identifying one or more reserved resources and one or more workload bursts in a production environment based on a resource consumption level exceeding a maximum permissible value, wherein the resource consumption level indicates usage of the one or more reserved resources in the production environment;
   determining an allocation of one or more additional resources required to manage the one or more workload bursts in the production environment based on the indicated difference in usage of the one or more reserved resources, in the production environment, between the resource consumption value and the permissible maximum value;
   identifying the determined allocation of the one or more additional resources in a non-production environment based on one or more share values which prioritize the determined allocation of the one or more additional resources; and
   providing the one or more reserved resources and the identified one or more additional resources from the non-production environment to the production environment based at least in part on the identified one or more share values.

8. The medium as set forth in claim 7, further comprising:
   capturing one or more snapshots of the non-production environment after the identifying the one or more additional resources, wherein the one or more snapshots are used to re-create the non-production environment; and
   providing a notification to the non-production environment to indicate termination of the identified one or more additional resources.

9. The medium as set forth in claim 7, wherein the identifying the one or more additional resources further comprises:

identifying one or more virtual machines associated with the non-production environment as one of the identified one or more additional resources.

10. The medium as set forth in claim 9, further comprising:
providing the notification to the non-production environment, wherein the notification indicates termination of the one or more virtual machines.

11. The medium as set forth in claim 7, wherein the identifying the one or more workload further comprising:
identifying the one or more workload bursts by monitoring usage of the one or more resources in the production environment, wherein the monitoring further comprises comparing usage of the one or more resources against a maximum threshold value.

12. The medium as set forth in claim 7 wherein the providing further comprises:
creating one or more virtual machines in the production environment; and
providing the created one or more virtual machines to the production environment.

13. A resource management computing device comprising:
one or more processors;
a memory coupled to the one or more processors which are configured to be capable of executing programmed instructions, which comprise the programmed instructions stored in the memory to:
identify one or more reserved resources and one or more workload bursts in a production environment based on a resource consumption level exceeding a maximum permissible value, wherein the resource consumption level indicates usage of the one or more reserved resources in the production environment;
determine an allocation of one or more additional resources required to manage the one or more workload bursts in the production environment based on the indicated difference in usage of the one or more reserved resources, in the production environment, between the resource consumption value and the permissible maximum value;
identify the determined allocation of the one or more additional resources in a non-production environment based on one or more share values which prioritize the determined allocation of the one or more additional resources; and
provide the one or more reserved resources and the identified one or more additional resources from the non-production environment to the production environment based at least in part on the identified one or more share values.

14. The device as set forth in claim 13, wherein the one or more processors is further configured to be capable of executing programmed instructions, which comprise the programmed instructions stored in the memory to:
capture one or more snapshots of the non-production environment after the identifying the one or more additional resources, wherein the one or more snapshots are used to re-create the non-production environment; and
provide a notification to the non-production environment to indicate termination of the identified one or more additional resources.

15. The device as set forth in claim 13, wherein the one or more processors is further configured to be capable of executing programmed instructions, which comprise the programmed instructions stored in the memory to:
identify one or more virtual machines associated with the non-production environment as one of the identified one or more additional resources.

16. The device as set forth in claim 15, wherein the one or more processors is further configured to be capable of executing programmed instructions, which comprise the programmed instructions stored in the memory to:
provide the notification to the non-production environment, wherein the notification indicates termination of the one or more virtual machines.

17. The device as set forth in claim 16, wherein the one or more processors is further configured to be capable of executing programmed instructions, which comprise the programmed instructions stored in the memory to:
identify the one or more workload bursts by monitoring usage of the one or more resources in the production environment, wherein the monitoring further comprises comparing usage of the one or more resources against a maximum threshold value.

18. The device as set forth in claim 13, wherein the one or more processors is further configured to be capable of executing programmed instructions, which comprise the programmed instructions stored in the memory to:
create one or more virtual machines in the production environment; and
provide the created one or more virtual machines to the production environment.

* * * * *